United States Patent Office 3,111,710
Patented Nov. 26, 1963

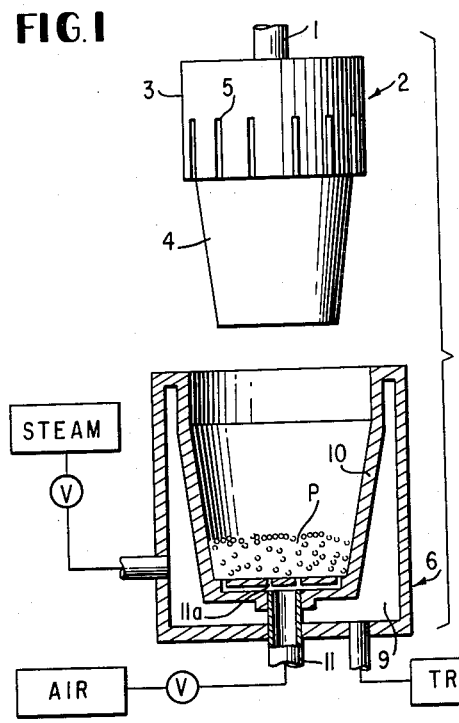
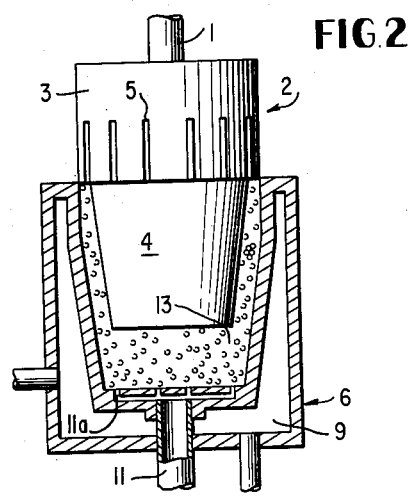
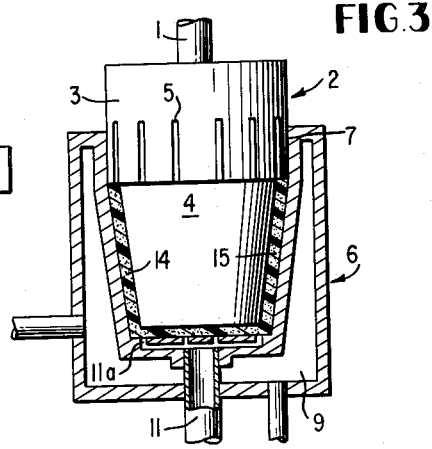
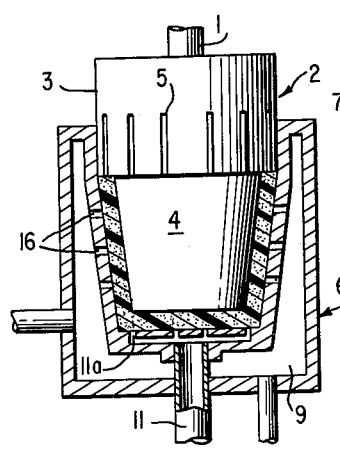
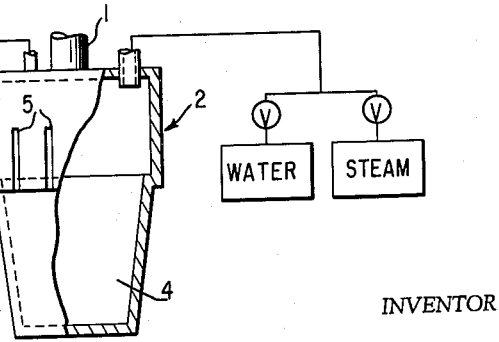

3,111,710
APPARATUS FOR MOLDING PLASTIC BEADS
Charles E. Plymale, Maumee, Ohio, assignor to Owens-Illinois Glass Company, a corporation of Ohio
Filed Nov. 14, 1960, Ser. No. 68,964
4 Claims. (Cl. 18—5)

This invention relates to apparatus for molding plastic beads and particularly plastic beads of the expandable type.

Various methods and molds have been devised for shaping foamable or expandable plastic beads. Conventional mold means have usually employed a male mold member or force plug which enters a female cavity of similar configuration. Upon closing the mold a cavity is formed which defines the article desired and upon applying pressure and heat, the beads are fused and thus form the article. However, it has been noted that the force plug does not always enter the female mold in precisely the same manner each time such that the spacing between the force plug and wall of the mold cavity varies. This, of course, has the practical disadvantage of producing a drinking cup, for example, having walls of nonuniform thickness. Accordingly, it would be highly desirable in the forming of containers from expandable plastic beads to provide a molding apparatus and method which would insure the formation of containers having uniform wall thickness.

It is, therefore, an object of this invention to provide a novel apparatus for molding plastic articles which are characterized by having a uniform wall thickness.

A further object of this invention is to provide a molding apparatus which will effect a uniform distribution of the molding material or beads.

A further object of this invention is to provide a molding apparatus which will effect a control of the gas used to distribute the molding material or plastic beads in the mold cavity.

A further object of this invention is to provide a molding apparatus which will effect a controlled flow of both the incoming and outgoing gas through the mold cavity.

These and other objects of this invention will be evident from the description which follows.

The novel apparatus of this invention comprises the use of a female mold member having an extension thereon which together define a mold cavity larger than the article to the formed and a male mold member having a lower narrow portion and an upper portion which engages the female member in close fit engagement when the mold members are brought together in the closed position. In addition grooves are provided in the male mold member or force plug which permits the escape of gas liberated or introduced into the mold cavity formed when the mold members are brought together. In addition means are provided for reciprocating one or both mold members, but preferably the force plug and also for heating the mold as is well known in the art. The same apparatus can be used to practice the novel method of this invention which comprises placing a prescribed quantity of molding material or plastic beads within the cavity of a female mold forming a substantially closed mold cavity from bringing together the male and female mold members introducing a gas into said mold cavity to distribute the beads uniformly therein, thereafter closing the mold completely so as to reduce the mold cavity to the size of the article being molded, and finally applying heat and pressure to fuse and coalesce the bead particles into an integral mass or article.

The method and apparatus of the present invention will be better understood by reference to the following drawings wherein:

FIGURE 1 is a cross-section view of the novel molding apparatus in which the female mold is partially filled with an amount of plastic beads necessary to form the finished article.

FIGURE 2 is a view similar to FIGURE 1 in which the force plug has descended to form a closed cavity with the female mold.

FIGURE 3 is similar to FIGURE 2 and shows the force plug in its lowermost position.

FIGURE 4 is a sectional view showing a modified apparatus for heating the plastic being molded.

FIGURE 5 is a sectional view showing a modified apparatus in which heating and cooling means are applied to the force plug.

Referring to the drawings, FIGURE 1 shows a ram 1 attached to a force plug 2 having a wider upper portion 3 with a slight taper and a narrower lower portion 4. The plug 2 also has a plurality of equally spaced grooves 5 whose function will be set forth below. Cooperating with said force plug is a lower female mold 6 having an upper portion 7 which extends above the upper limit of the finished article (cf. FIGURE 3) and which portion has a taper complementing the upper portion 3 of plug 2. Within mold member 6 is a steam chest 9 connected to a source of steam. Connected to the bottom of the mold cavity 10 by openings 11a is conduit 11 which is connected to a source of gas, preferably air. As illustrated in FIGURE 1 mold cavity 10 is partially filled with an amount of plastic beads P which will completely form the article to be molded. Force plug 2 is then caused to descend until a substantially closed cavity is formed, as shown by FIGURE 2 at which time gas is introduced through conduit 11 to effect a uniform distribution of the beads throughout the cavity 13 defined by the plug 2 and female mold cavity 10. As the gas enters conduit 11 a free flow of the gas through cavity 13 takes place and the excess gas is permitted to escape or bleed through grooves 5 which extend from the cavity 13 to the surrounding air. The force plug then continues its downward motion to its lowermost position at which time steam is caused to enter chest 9 to fuse and expand the beads so as to form the article shown in the mold of FIGURE 3. Due to the close tolerances or clearances maintained between tapered elements 3 and 7 plus the concomitant uniform distributing action of the incoming gas in cooperation with the grooves 5 as shown in FIGURE 2, the article formed is characterized by having side walls 14 and 15 of uniform thickness. These grooves can vary in depth and width but grooves about ⅛" wide and about 1/100" deep have proven satisfactory in the present process. In addition it will also be noted that during the final molding step, as shown in FIGURE 3, the grooves 5 will also have the salutary effect of serving as bleed orifices for any in situ generation of gases formed, namely, the liberation of the blowing gases present in the expandable beads P. Upon cooling, the mold can be opened and the article removed from the mold cavity.

FIGURE 4 shows a modification of the female mold which provides for the direct introduction of steam by channels 16 into the cavity from the steam chest 9 and is recommended over the conduction heating of FIGURE 3 where the wall thickness of the article being molded exceeds ¼ inch.

FIGURE 5 shows an alternative method of applying conduction heating wherein the steam is caused to enter the force plug instead of the female mold as in FIGURE 3. In addition cooling means are also shown.

Traps have been employed in each of the modifications for the purpose of removing water due to steam condensation.

It will be apparent to those familiar with the plastic molding art that numerous modifications can be made in the apparatus of the present invention. Well known methods for ejecting the finished article can be adapted to the present apparatus and include such accepted ejection means as mold inserts, knock-out plates, and gas pressure assists. In addition it will generally be found desirable to preheat the female mold shown in FIGURE 3 to reduce steam condensate formation during the heating phase. Moreover, if found desirable, a combination of conduction heating systems can be employed, such as heating both the female mold (FIGURE 3) and the force plug (FIGURE 5). The molds per se can be made of various metals including aluminum, stainless steel, and brass and should be made to withstand pressures on the order of 50 p.s.i. It will also be evident that the cooling means for the force plug shown in FIGURE 5 could also be applied to the female mold of FIGURE 3 after the article has been molded.

In addition any plastic beads can be employed in the present apparatus providing they will fuse and undergo further expansion upon application of heat. Plastic beads which have been found particularly suitable in the present apparatus are those designated as "Dylite" which are polystyrene beads made by the Koppers Company. These beads are capable of expansion due to the presence of a volatile liquid, such as n-pentane, as an expanding agent. In the unexpanded state these beads are referred to as virgin beads and are capable of being expanded 60 times their original volume. Frequently the beads are partially expanded or given a pre-expansion treatment which consists of heating the virgin beads at 180–240° F. until a density of 1–20 lbs. per cu. ft. is obtained. These pre-expanded beads can then be employed in a subsequent molding process such as that disclosed herein. In the present process pre-expanded beads having a density of 2–10 lbs. per cu. ft. have been satisfactorily employed. Although n-pentane has been mentioned as an expanding agent it is obvious that other expanding agents can be employed. Moreover, particulate polystyrene containing one of the solid chemical expansion agents which decompose on heating to yield a gaseous expansion agent can also be used. It is also apparent that any plastic can be used in the present process provided it is capable of being formed and further expanded upon the application of additional heat although polystyrene is preferred. Further information regarding the properties of "Dylite" is set forth in the Koppers Company, Inc., bulletin entitled "Dylite Expandable Polystyrene" (1959).

Although not shown any suitable ram means can be employed to impart the desired reciprocating motion to mold 2. In addition the steam heating means can be replaced by other heating means such as electrical heating. Other modifications within the spirit and scope of the present disclosure and appended claims will be suggested to those skilled in the art.

While the illustrative embodiments of the invention have been described hereinbefore with particularity, it will be understood that various other modification will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as equivalents thereof by those skilled in the art to which the invention pertains.

What I claim is:

1. Apparatus for molding articles comprising a female mold member having a bottom which substantially closes the base of said member, said bottom having at least one aperture therein, an extension on said member which projects above the height of the finished article to be formed in said member, a male mold member having a lower narrow portion and an upper portion which is of such configuration as to be capable of close fit engagement with the female mold extension and which upper portion upon entering the extension on said mold member defines a substantially closed cavity larger than the article to be formed, grooves in the upper portion of said male mold member, means for reciprocating said male mold member, and means for heating said female mold.

2. Apparatus for molding articles comprising a female mold member, having a bottom which substantially closes the base of said member, said bottom having at least one aperture therein, an extension on said member which projects above the height of the finished article to be formed in said member, a male mold member having a lower narrow portion and an upper portion which is of such configuration as to be capable of close fit engagement with the female mold extension and which upper portion upon entering the extension on said mold member defines a substantially closed cavity larger than the article to be formed, grooves in said male mold member, means for introducing a gas into the mold cavity through said aperture so as to distribute the molding material positioned therein prior to the molding of the article in final form, means for reciprocating said male mold member, and means for heating said female mold.

3. Apparatus of claim 2 in which the female mold extension has a slight taper and the upper portion of said male mold member also has a matching taper.

4. Apparatus for molding articles comprising a female mold member, having a bottom which substantially closes the base of said member, said bottom having at least one aperture therein, an extension on said member which projects above the height of the finished article to be formed in said member, a male mold member having a lower narrow portion and an upper portion which is of such configuration as to be capable of close fit engagement with the female mold extension and which upper portion upon entering the extension on said mold member defines a substantially closed cavity larger than the article to be formed, grooves in said male mold member, means for introducing a gas into the mold cavity through said aperture so as to distribute the molding material positioned therein prior to the molding of the article in final form, means for reciprocating said male mold member, and means for heating at least one of said mold members.

References Cited in the file of this patent

UNITED STATES PATENTS

| | | |
|---|---|---|
| 2,396,406 | Anderson | Mar. 12, 1946 |
| 2,744,288 | Fienberg et al. | May 8, 1956 |
| 2,752,635 | Miller | July 3, 1956 |
| 2,844,857 | Jones | July 29, 1958 |
| 2,951,260 | Harrison et al. | Sept. 6, 1960 |

FOREIGN PATENTS

| | | |
|---|---|---|
| 256,609 | Switzerland | Mar. 16, 1949 |